United States Patent [19]

Adorjan

[11] Patent Number: 4,826,354
[45] Date of Patent: * May 2, 1989

[54] UNDERWATER CRYOGENIC PIPELINE SYSTEM

[75] Inventor: Alexander S. Adorjan, Pearland, Tex.

[73] Assignee: Exxon Production Research Company, Houston, Tex.

[ * ] Notice: The portion of the term of this patent subsequent to Jan. 12, 2005 has been disclaimed.

[21] Appl. No.: 846,431

[22] Filed: Mar. 31, 1986

[51] Int. Cl.$^4$ .............................................. F16L 1/04
[52] U.S. Cl. .................... 405/158; 138/106; 285/47; 405/169; 405/172; 405/185
[58] Field of Search ............... 405/154, 158, 169, 170, 405/172, 185; 138/105–108, 149; 285/47, 226

[56] References Cited

U.S. PATENT DOCUMENTS

4,718,459  1/1988  Adjoran ........................... 138/105

Primary Examiner—David H. Corbin
Attorney, Agent, or Firm—Herbert E. O'Niell

[57] ABSTRACT

The invention is an underwater LNG pipeline system in modular sections wherein multiple LNG pipelines utilizing expansion joints to compensate for contraction are connected together by braces to form an integral frame, and including pressure vessels enclosing the expansion joints to permit access to the expansion joints for inspection or maintenance. In a second embodiment, the frame is a separate elongate space frame connected to the pipeline and the pressure vessels. In a third embodiment, the pipelines are INVAR steel and no expansion joints or pressure vessels are included.

56 Claims, 6 Drawing Sheets

UNDERWATER CRYOGENIC PIPELINE SYSTEM

BACKGROUND OF THE INVENTION

1. Field of the invention

This invention relates to underwater cryogenic pipeline systems. In particular, the invention relates to underwater liquified natural pipeline gas systems that are designed for use in ice infested waters and are adapted to be readily maintained or repaired.

2. Description of related art

The state of the art of underwater liquified natural gas (LNG) pipeline systems is outlined in substantial detail in U.S. Pat. No. 4,718,459, titled "Underwater Cryogenic Pipeline System", filed Feb. 13, 1986 and having Ser. No. 829,054, which is hereby incorporated by reference.

Several substantial design considerations for LNG pipeline systems are discussed in my copending application identified above. They include: material selection for durability and toughness; compensation for contraction of the pipeline; insulation to reduce heat loss; and anchoring. Another consideration in LNG pipeline design is maintenance and repair of the pipeline. Cryogenic pipeline systems, except those using high nickel content steel, and in particular 36% nickel (or "Invar") steel, rely on expansion joints, such as bellows or pipe loops, to compensate for thremal contraction in the system. These expansion joints are where much of the axial movement in the LNG pipeline system occurs. In a metal bellows expansion joint the integrity of the bellows is important because the metal bellows is thinner than the inner pipe wall and is subject to stresses from both pressure loadings and from movement of inner pipe. Thus, it may be desirable to provide some way to access the expansion joints after the pipeline system is installed so that the expansion joints may be inspected or, if necessary, repaired or replaced.

Two approaches to LNG pipeline system maintenance and repair are briefly discussed below. In U.S. Pat. No. 3,379,027 to Mowell, the pipeline may be disconnected at its offshore end and withdrawn from the protective casing if repairs are necessary. In underwater tunnel LNG pipeline systems, the pipelines are in a watertight tunnel that may be entered for repairs if needed. An example of such a system is the Cove Point, Md. LNG receiving terminal underwater tunnel system that is described in several publications.

SUMMARY OF THE INVENTION

The invention solves the problems in the prior art with underwater LNG pipelines. In particular, the invention permits maintaining or repairing the expansion joints in an underwater LNG pipeline system in a relatively inexpensive and expedient manner. The invention is a frame supported underwater LNG pipeline system having integral pressure vessel enclosures around the expansion joints. The pipeline system of the invention comprises a plurality of insulated LNG pipelines. Each pipeline utilizes conventional metal bellows expansion joints at regular intervals to compensate for contraction. A steel watertight jacket surrounds each of the insulated LNG pipelines to prevent water from entering and damaging the pipeline or the insulation around the pipeline. The metal jacket is preferably carbon steel, although it could be 9 percent nickel steel to provide a cryogenic jacket material in case a LNG leak develops inside the pipeline. The jackets of the pipelines are interconnected by a plurality of braces to form a strong truss structure, or frame. Connecting the pipelinse together makes the frame a strong structure, and obviously much stronger than the individual pipelines. Pressure vessels are attached to the frame and to the outer jackets of the pipelines and enclose the expansion joints. The pressure vessels include a hatch adapted to be connected to a diving bell or submersible vehicle so that if maintenance or repair of the expansion joints is required, divers may enter the pressure vessel through the hatch to gain access to the expansion joints.

The pressure vessel is preferably a steel vessel with internal dimensions sufficient to enclose the expansion joints and permit working room for inspecting and repair, if necessary. The vessels in the preferred embodiment are sized to contain four pairs of expansion joints and should be designed to withstand the external water pressure at the design depth, loadings on the pressure vessel resulting from burial in the sea bed and loading imposed by integration into the frame. In addition, the pressure vessel should be designed to withstand full pipeline design pressure, including surge, or transient pressures, in the event a leak into the pressure vessel develops in the pipeline. A safety relief valve may be provided in the pressure vessel to vent excess pressure.

The configuration of the expansion joints of the pipeline is preferably the same as disclosed in my copending patent application identified above. The expansion joints are in closely adjacent pairs spaced about 73 m. (240 ft.) apart. An intermediate pipe anchor is provided between the two expansion joints in each pair to anchor the inner pipe to the frame inside the pressure vessel. Approximately midway between successive pairs of expansion joints, the inner pipe of each of the pipelines is attached to its surrounding outer jacket, and thus the frame, by a second type of intermediate pipe anchor. One expansion joint is therefore located between successive intermediate pipe anchors. As a result, the inner pipe is firmly anchored about every 36.6 m. (120 ft.). This distance between anchors is within the capabilities of presently commercially available expansion joints.

The LNG pipeline system described above is preferably prefabricated in modular sections and transported to and connected on-site. The pipeline system may be laid on or under the sea bed using conventional methods. In areas where there is a possibility of ice "gouging", the pipeline is preferably buried under the sea bed to reduce any possibility of damage.

Since the inner pipes of the pipelines are attached to the frame, heavy anchoring is not needed to transmit forces in the inner pipes to the ground. Most of the forces are taken by the truss system. Since the pipeline system will also be subject to transient forces, such as hammer forces, for example when a valve in the system is closed suddenly, some method is needed to transmit such transient forces to the ground. Since the transient forces will be concentrated at the ends of the pipeline, ground anchors 11 may be provided at the ends of the pipeline. When the pipeline system is buried in the sea bed, the friction from the surrounding soil acts as additional anchoring, called "virtual anchoring."

In another embodiment of the invention, the inner pipe is 36 percent nickel steel called "Invar" steel. Due to the low coefficient of thermal expansion of Invar steel, no expansion joints are required. Thus, the other features of the construction of this embodiment will be the same as the first embodiment, however, no expansion joints are needed and no pressure vessels are utilized.

BRIEF DESCRIPTION OF THE DRAWINGS

The several embodiments of the invention are shown in the drawings, in which like reference numbers indicate like parts. A description of each drawing follows.

DETAILED DESCRIPTION OF THE INVENTION

The following description covers loading a LNG tanker. The invention and the description are equally applicable to all other cryogenic products and all similar pipeline applications.

Figures 1, 2, 4:
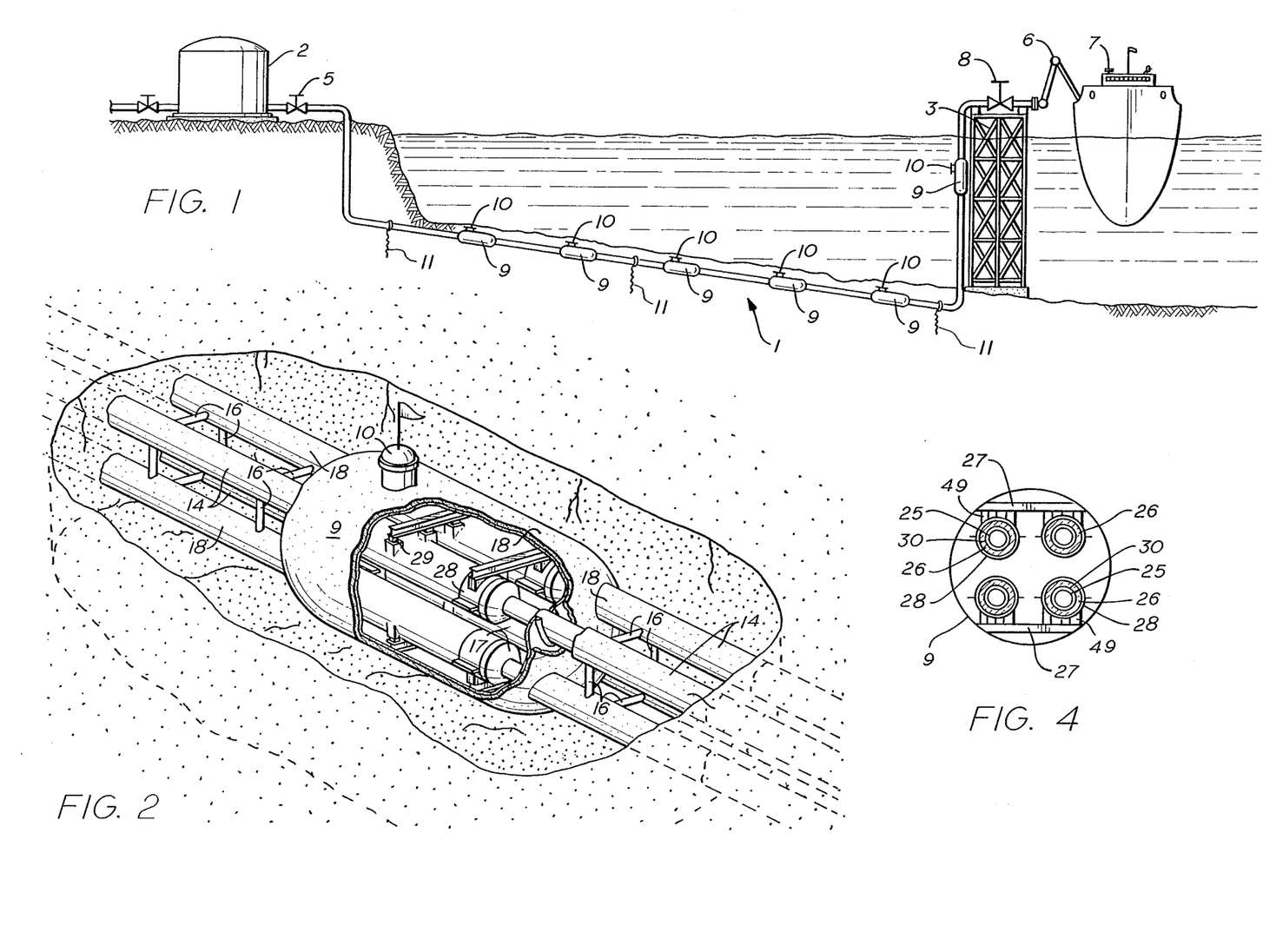
FIG. 1 is a plan view of an embodiment of the invention for transporting LNG from a shore-based storage facility to an offshore loading facility.
FIG. 2 is a perspective view of a section of the preferred embodiment of the invention including a cutaway view of the interior of the pressure vessel of the invention.
FIG. 4 is a cross sectional view through the pressure vessel of FIG. 3.

FIG. 1 shows the invention. The underwater LNG pipeline system is indicated generally at 1. The pipeline extends from a shore-based LNG storage tank 2 to an offshore loading facility 3. LNG from production facilities is supplied to the storage tank 2 through a supply pipeline 4. An outlet valve manifold 5 controls flow of the LNG from the storage tank into the onshore end of the pipeline system. The offshore end of the pipeline system is connected to conventional LNG loading arms 6 that are connected to the LNG tanker 7. A LNG loading valve manifold 8 may be included in the system to control flow of LNG during loading operations. The pipeline includes a plurality of pressure vessels 9 that surround the expansion joints in the system. The pressure vessel include hatches 10 that permit divers to enter the pressure vessels to inspect or repair the expansion joints. The pipeline system is shown buried in the sea bed. If buried, the lines should be laid about 2 m. (6.5 ft.) under the sea bed.

FIG. 2 shows a section of the preferred embodiment of the invention comprising a four pipeline frame supported system buried in the sea bed. The soil is cut away to show the details of the system. The system consists of four steel jacketed LNG pipelines 14. The pipelines are connected together by braces 16 to form a strong truss structure. A pressure vessel 9 is connected to the outer jackets 17 of the pipelines in a leak tight manner. The pressure vessel also includes a hatch 10 adapted to permit diver access to the interior of the pressure vessel. A concrete coating 18 applied by conventional methods may be needed to counteract the buoyancy of the system so that it will stay submerged and buried in the sea bed.

FIG. 2 also illustrates the interior details of the pressure vessel 9. These details are described below.

Figure 3:
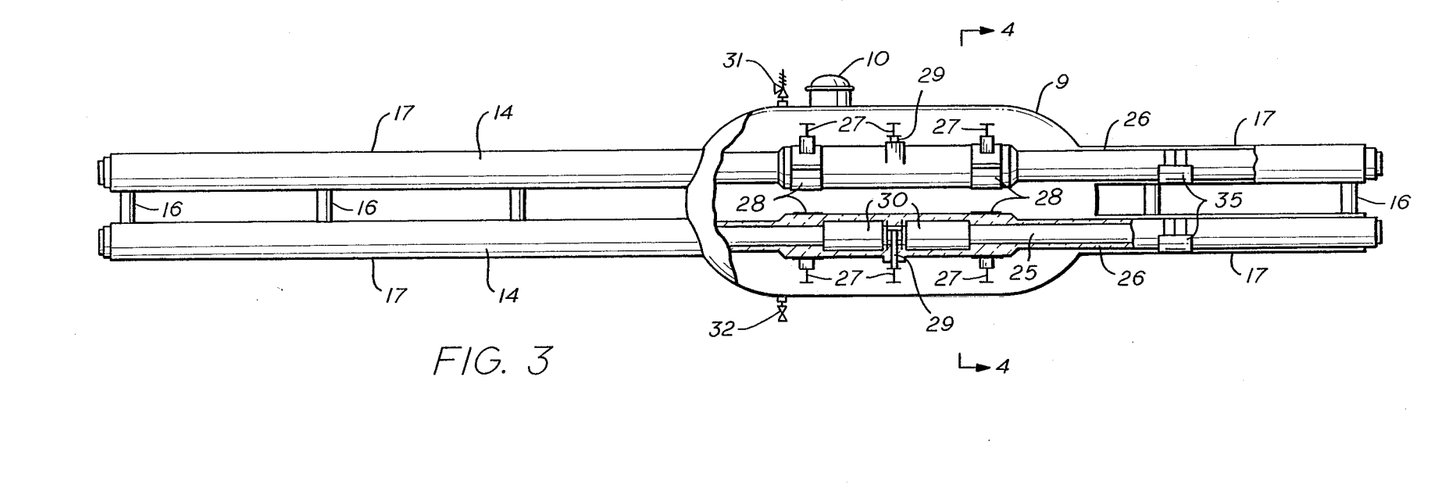
FIG. 3 is a partial cutaway side view of a pressure vessel module of the preferred embodiment of the invention.
Figure 5:
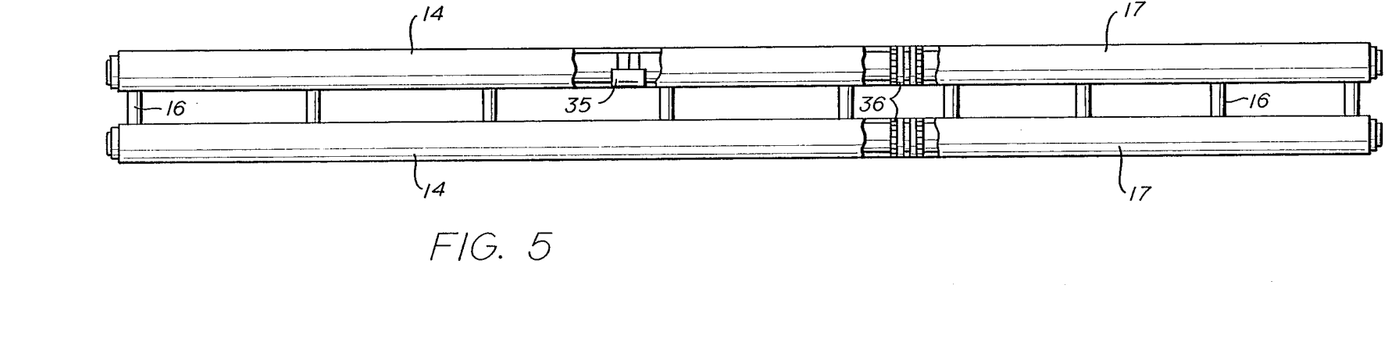
FIG. 5 is a partial cutaway side view of a straight module of the preferred embodiment of the invention.
Figures 14, 15, 16:
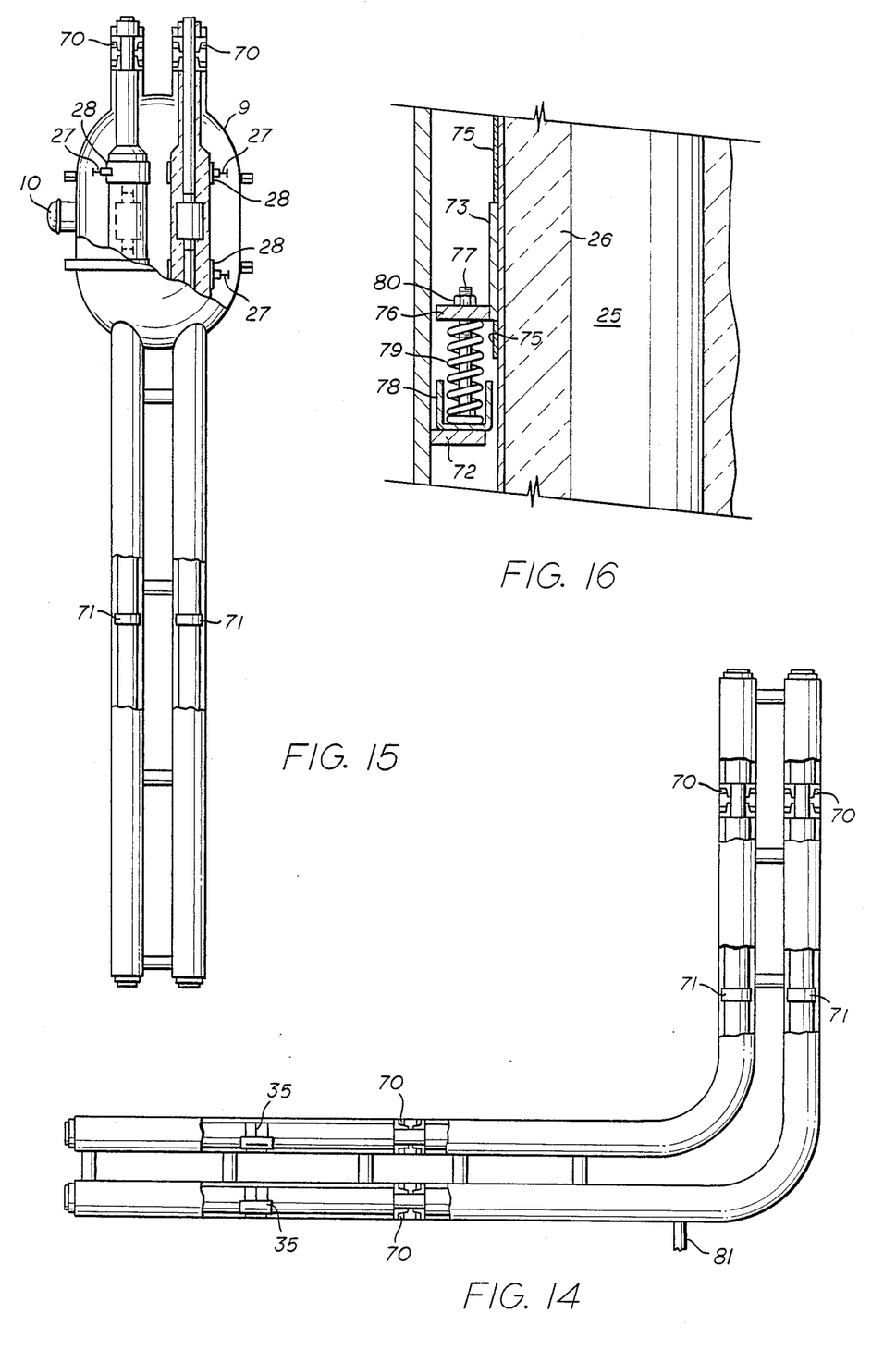
FIG. 14 is a partial cutaway side view of a corner module of the preferred embodiment of the invention.
FIG. 15 is a partial cutaway side view of a riser module of the preferred embodiment of the invention.
FIG. 16 is a cross sectional side view of an insulation hanger support of the invention.

The preferred embodiment of the invention is preferably a modular system, consisting of interconnected pressure vessel modules of FIGS. 3 and 4, straight modules of FIG. 5, corner modules of FIG. 14 and riser modules of FIG. 15. The system is preferably buried in the sea bed and anchored at its offshore end by attachment to the offshore loading facility 3. The components of the system are discussed in detail below.

FIG. 3 shows the details of a pressure vessel module. The pressure vessel module of the pipeline system includes four pipelines comprising two LNG loading or unloading lines, one vapor return line and one common spare line for LNG or vapor. All the pipelines are identical so that if any one of the lines is damaged, the common spare will be used in its place. Each of the pipelines consist of an inner pipe 25 that is constructed out of a cryogenic material, preferably 304L stainless steel. Insulation 26 surrounds the inner pipe to reduce heat loss. Concrete coating is not shown in FIG. 3 allthough it may be required as mentioned above. The outer jacket 17 of each of the 4 pipelines is firmly attached to the pressure vessel 9, such as by welding. The connection must be water and gas tight. The outer jackets 15 thus serve as integral structural members of the truss structure formed by the outer jackets 17 and the interconnecting braces 16. Since the pressure vessel is a structural element of the frame, it therefore needs to be designed accordingly so it will withstand forces imposed during installation and during operation of the pipeline system.

A plurality of crossmembers 27 extend laterally across and are attached to the inside of the pressure vessel to anchor and support the inner pipe and insulation. Four main guide supports 28 attached to the crossmembers are mounted around the insulation to support the weight of the pipe and insulation. Primary intermediate pipe anchors 29 between the main guide supports are also attached to crossmembers 27 and anchor the inner pipe to the frame through the pressure vessel. Each of the pipelines includes a pair of expansion joints 30. The primary intermediate pipe anchor is preferably located between the two expansion joints in each pair. Insulation 26 is applied in a thick layer around the expansion joints 30 to reduce heat leakage. A glass reinforced epoxy cover, described in more detail below, also preferably surrounds the insulation at this point.

The pressure vessel 9 includes an access opening covered by a hatch 10. The exact design of the hatch 10 is not part of this invention. The purpose of the hatch is to permit access to the interior of the pressure vessel 9 by divers or personnel transported to the pressure vessel by a submersible. The pressure vessel preferably includes a pressure relief valve 31 mounted through the pressure vessel wall and a purge valve 32 through the wall of the pressure vessel at the bottom of the vessel. The pressure relief valve 31 prevents damage to the pressure vessel by overpressure in the event of a pipeline leak. The purge valve permits the interior of the tank to be purged prior to entry into the vessel by personnel.

The pipeline system also preferably includes a plurality of sliding guide supports 35 to support the weight of the insulation on the inside of the outer jacket. The sliding guide supports are preferably provided at intervals of about 4.5 m (15 ft.). The sliding guide support is a steel saddle with sliding blocks attached to is outer surface that will permit relative movement between the inner pipe and insulation and upper jacket. The construction of the sliding guide supports is detailed below.

The modules are preferably 36.6 m. (120 ft.) in length. This is the preferred length based on the contraction compensating abilities of commercially available metal bellows expansion joints for a pipeline of 26 inches diameter. Naturally, with design changes it may be possible to utilize modules having any preselected length.

In FIG. 5, a straight module of the preferred embodiment of the invention is illustrated. The construction of the straight module is similar to the construction of the straight sections of the pressure vessel module. The straight module includes a plurality of sliding guide supports 35. In addition, each pipeline in the straight module includes a secondary intermediate pipe anchor 36. The location of the intermediate anchors is selected so that when the straight modules are connected to the pressure vessel modules the distance between the primary and secondary intermediate pipe anchors (29, 36) is not in excess of the pipe length that can be handled by the expansion joint 30. The construction of the primary intermediate anchors and the inner guide supports is detailed below.

Figure 6:
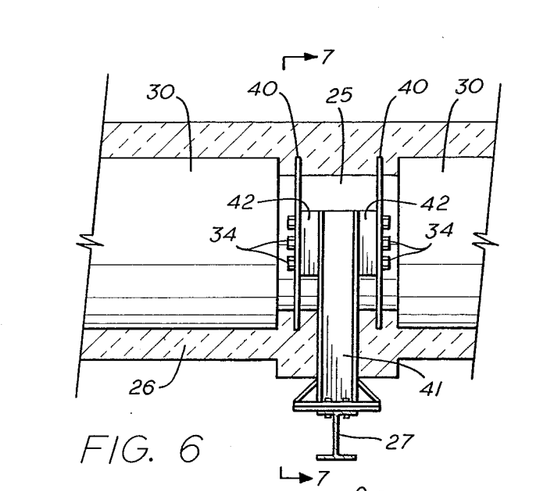
FIG. 6 is a side view of a primary intermediate pipe anchor of the invention.
Figure 7:
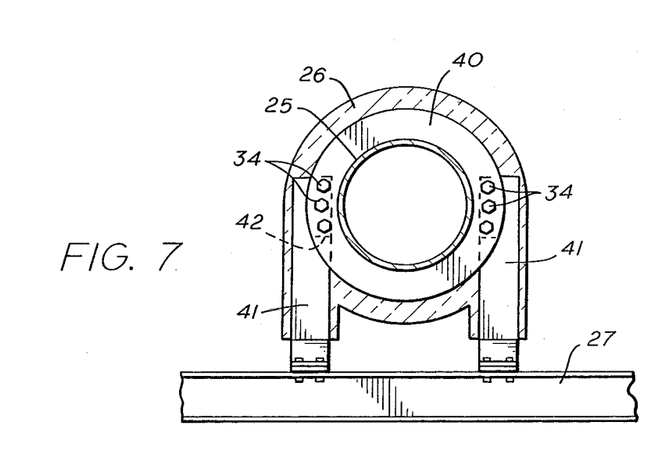
FIG. 7 is a cross sectional view of the pipe anchor of FIG. 6.

The primary intermediate pipe anchor design is illustrated in detail in FIGS. 6 and 7. The anchor consists of at least two spaced apart rings 40 fixed to the inner pipe 25 between the expansion joints 30. Strong vertical support beams 41 are attached to the lateral crossmember 27 inside the pressure vessel by bolting or welding. The support beams 41 extend upwardly on each side of the inner pipe between the annular rings 40. Four insulating blocks 42 are located between the support beams 41 and the annular rings 40. The annular rings 40 are then attached to support beams 41 by nuts and bolts 43 extending through holes drilled through the insulating blocks 42. The insulating blocks are preferably made of material that is both strong in compression and has a relatively low coefficient of thermal conductivity. A suitable material is a resin impregnated wood, such as "Permali," a product manufactured by Permali, Inc., Mt. Pleasant, Pa. Insulation 26 surrounds the expansion joints and anchor assembly to reduce heat loss.

Figure 8:
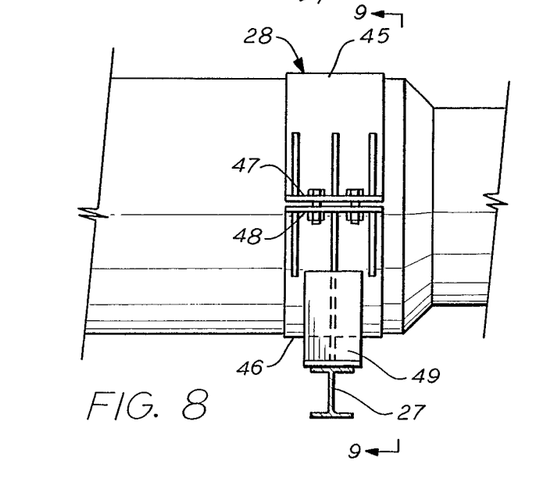
FIG. 8 is a side view of a main guide support of the invention.
Figure 9:
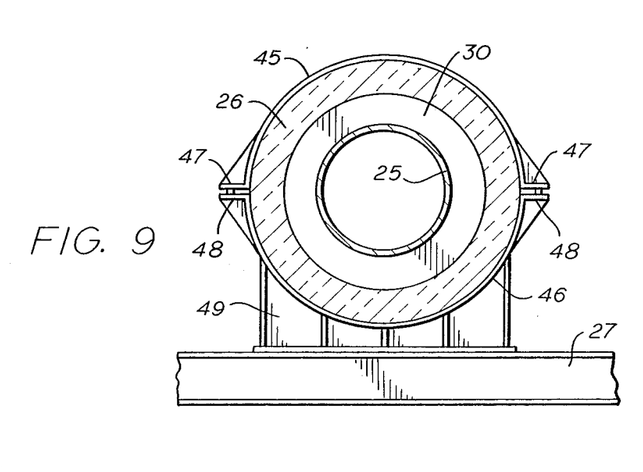
FIG. 9 is a cross sectional view of the main guide support of FIG. 8.

The details of construction of the main guide supports 28 are shown in FIGS. 8 and 9. The main guide supports are not fixed to the pipeline. Instead, they fit around the GRE covering around the insulation with sufficient clearance to allow axial movement of the insulation, if necessary. However, the clearance needs to be sufficiently small that the expansion joint 30 is protected from lateral forces and movements resulting from the weight of the inner pipe and from bowing of the inner pipe during installation, start up, and shut down of the pipeline system. The main guide support consists of an uppe saddle 45 and a lower saddle 46. The saddles are preferably relatively wide because the weight of the inner pipe 25 and the lateral forces at the saddles are transmitted through the insulation surrounding the inner pipe. The saddle is wide to transfer these forces over a large area of the insulation. The upper and lower saddles are connected at flanges 47 and 48 by any convenient means, such as nuts and bolts. The lower saddle 46 is attached to two upright support beams 49 that are fixed to a crossmember 27 inside the pressure vessel. The thermal insulation 26 surrounding the inner pipe 25 under the main guide supports is preferably a strong, high density polyurethane foam in view of the loads that will be resisted by the main guide supports. This is discussed in greater detail below.

The insulation 26 is preferably polyurethane foam with a glass fiber reinforced epoxy, or GRE, covering. The insulation may be sprayed onto the inner pipe 25 before the assembly of the inner pipes into the modules or it may be prefabricated in sleeves. The GRE covering should reduce the possibility the deterioration of the insulation and provide for a long life. The insulation is preferably sprayed on in several, preferably three, individual layers with a crack arresting glass cloth (not shown) molded between each of the layers. The glass cloth should be bonded to the insulation, for example with epoxy or polyurethane foam, so that each layer of insulation is surrounded by a watertight covering. Except for Invar inner pipes, it is necessary to have a radial gap between the outside of the inner pipe and the inside of the insulation so that contraction of the inner pipe will not crack the insulation. Any of the known methods of obtaining the radial gap may be utilized, such as use of a cloth or other material applied around the inner pipe before insulation is sprayed. Thus, if the insulation is sprayed around dummy pipes to produce a hollow sleeve of sprayed insulation material, the dummy pipe is sized so that the radial gap is provided when the dummy pipe is removed and the insulation sleeve is fitted over the inner pipe during construction of the modules.

Preferably, the insulation around the inner pipe under the main guide supports 28 will be a high density polyurethane foam thermal insulation with a greater compressive strength than the lower density foam insulation used elsewhere in the pipeline system. For example, a polyurethane foam having a density of 30 kg/m$^3$ is considered a high density polyurethane foam. A high density foam is preferred because the insulation at this point is a bearing member that supports the weight of the inner pipe and all loadings caused by bowing. A stronger insulation material is preferred at this point because the main guide supports will resist buckling of the inner pipe and will secure the expansion joints against unexpected rotation, or bending.

Figure 10:
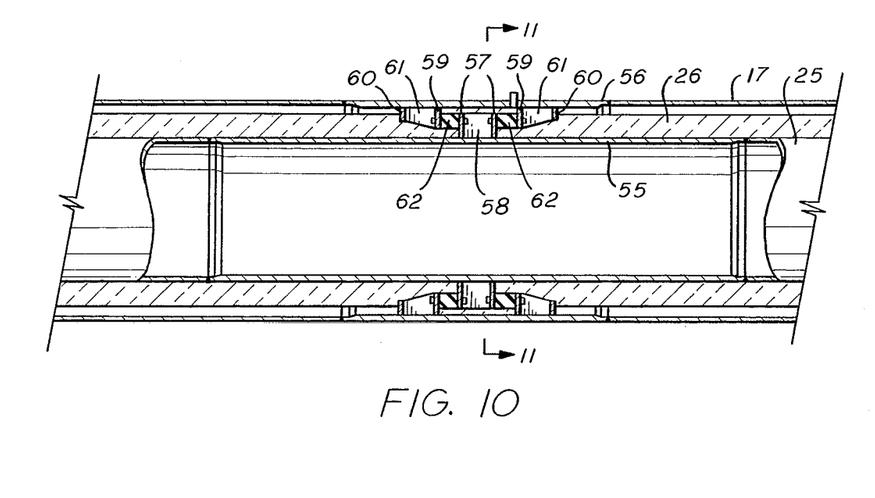
FIG. 10 is a side cross sectional view of a secondary intermediate pipe anchor.
Figure 11:
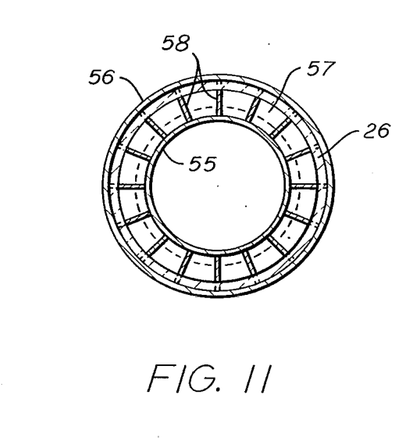
FIG. 11 is a cross sectional view of the intermediate pipe anchor of FIG. 10.

The secondary intermediate pipe anchor 36 is shown in detail in FIGS. 10 and 11. The secondary intermediate pipe anchors consist of an inner spool 55 and an outer housing 56 adapted to be welded to the inner pipe and outer jacket, respectively. Two spaced apart thrust rings 57 are fixed to the outside of the inner spool at about its midpoint. A plurality of ribs 58 are attached between the two rings for reinforcement. Four annular thrust rings are attached to the inside of the outer housing 56. Two of the thrust rings 59 are located adjacent to and on either side of the two thrust rings 57 on the inner spool. Two back-up rings 60 are spaced further away from the first two rings 59. A plurality of reinforcing plates 61 are connected between the two sets of the thrust rings on the outer housing 38. Forces are transmitted from the inner pipe of the pipeline to the inner spool 55 of the intermediate anchor. These forces are transmitted from the inner spool to the outer housing and outer jacket through two insulating rings 62 between the thrust rings 57 on the inner spool and the thrust rings 59, 60 on the outer housing. The insulating rings are held in position by a plurality of bolts through the thrust rings and insulating rings. The insulating rings are preferably made of a material that is strong in compression and has a low coefficient of thermal conductivity, such as Permali. The inside of the secondary intermediate anchor is filled with insulating material to reduce heat loss.

Because of the relatively complicated design of all of the anchors, it is preferable they be shop fabricated as units ready to be interconnected with the other elements of the pipeline system when the modules are constructed.

Figure 12:
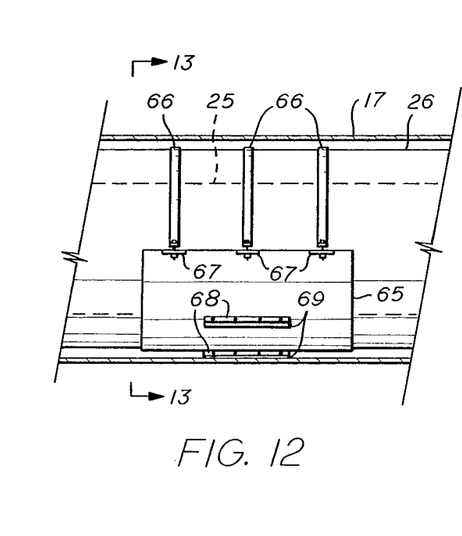
FIG. 12 is side view of a sliding guide support.
Figure 13:
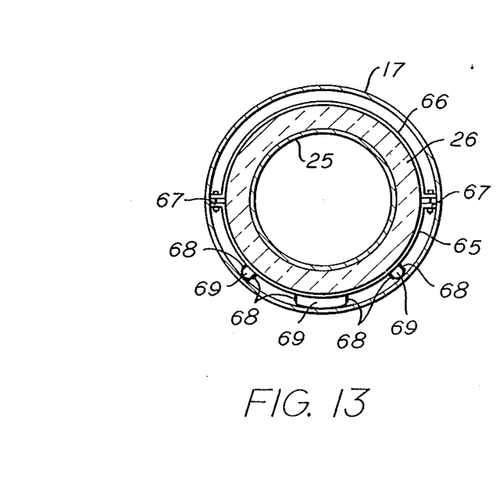
FIG. 13 is a cross sectional view of the sliding guide support shown in FIG. 12.

FIGS. 12 and 13 are views of the sliding guide supports of the invention. The sliding guide support 35 is strapped around the insulation 26 on the inner pipe 25 inside the outer jacket. The sliding guide support comprises a metal saddle 40 that fits around the lower portion of the insulation. A number of steel straps 66 are fitted around the top of the insulation 26 and attached to lugs 67 on the saddle 65 by bolts or screws. Angle brackets 68 are attached to the outside of the saddle by any suitable means, for example rivets, and sliding blocks 69 are attached between the angle brackets. The sliding block is made of a relatively hard material that will slide on the inner surface of the outer jacket 15. A suitable material would be a polyamide plastic block.

A corner module for the preferred embodiment invention is illustrated in FIG. 14. The corner module is designed to be connected to the end of a pressure vessel module. The inner pipes and outer jackets of the corner module are bent to define a corner. As in the other modules, the corner module includes a plurality of sliding guide supports 36 on the horizontal sections of the inner pipe. Each pipeline in the corner module also includes two main anchor supports 70. A first main anchor support is located on the horizontal section of the corner module and a second main anchor support 70 is located on the vertical portion of the corner. The main anchor support is described in detail below. No expansion joints are included between the two main anchor supports on each pipeline because for a large radius corner like the one shown in FIG. 14, for example, about five times diameter for a 26-inch pipe corner module in which the horizontal length of the inner pipe and the vertical height of the inner pipe between the anchors is about exceed 12.3 m. (40.4 ft.), expansion joints are not needed. The construction of the main anchor supports 70 is essentially the same as the design of the secondary intermediate pipe anchors 36. However, the main anchor supports 70 are constructed out of heavier materials and preferably include more and heavier strengthening ribs and plates than the secondary intermediate pipe anchors 36, since the main anchor supports must be designed to withstand at least the normal axial loadings due to temperature, as well as the full transient loadings on the inner pipe. For a 26 inch pipeline system, the loadings resisted by the main anchor supports may be in excess of about six to seven times the design load for the intermediate pipe anchors 36. Once the main anchor support loadings are known, a calculation of the necessary sizes of the components of the main anchor support is relatively simple.

Each of the pipelines in the corner module also includes an insulation hanger support 71. The insulation hanger support suspends the insulation to prevent the weight of the insulation from damaging the insulation on the vertical sections of the pipeline system.

The insulation hanger support 71 is shown in detail in FIG. 16. It comprises a metal ring 72 attached, such as by welding, to the interior of the outer jacket. A steel band 73 is fitted over the GRE covering 74 over the insulation and is locked in place by GRE rings 75 above and below the steel band 73. A second annular ring 76 is attached to the outside of the steel band and has holes drilled through it to permit bolts 77 to extend through the second ring. The bolt holes, which may be eight to ten or more in number as may be appropriate, are symmetrically spaced around the second annular ring. An annular support channel 78 is mounted on top of the first annular ring 72 and the bolts 78 are attached to and extend upwardly from the inside of the support channel 78. The number and size of the bolts corresponds with the number of size of holes through the second annular ring 76. Each of the bolts 78 has a spring 79 over it to support the weight of the insulation. Preferably the bolt includes a nut 80 threaded onto the end of the bolt to prevent the assembly from possibly coming apart. This method of spring mounting permits some relative axial movement between the first annular support ring 72 and the insulation.

The other construction details of the corner module are the same as for the straight and pressure vessel modules, with one exception. Obviously, the design of the insulation in the corner module will be different. For example, it is preferable that the bent portions of the outer jackets be provided in two parts, cut longitudinally, so that the inner pipe may be insulated and the outer jacket corner welded around it during construction of the corner modules. However, the exact design of the corner insulation is not considered part of to the invention and, since it is within the abilities of those of ordinary skill in the art, will not be described in detail.

When the pipeline system is installed, it will preferably include a sliding support 81 under the horizontal portion of the corner module. The sliding support is shown schematically in FIG. 14. It could be constructed in several ways. For example the corner module could be placed over a number of pilings driven into the sea bed. Alternatively, a concrete pier or foundation could be poured and covered with a steel beam or cap on which the bottom of the corner module would rest. The sliding support will permit some axial movement of the end of the pipeline system. This movement should be minimal because the frame is buried in the sea bed.

As an alternative to the corner module shown in FIG. 14, a corner module could be constructed utilizing expansion joints on each of the pipelines in the system. In this event, the radii of the ends in the pipelines could be significantly reduced and a pressure vessel would be required surrounding the expansion joints in a manner similar to that described above. Howver, this would add additional cost to the system. The biggest benefit of the alternative corner module design is that it is not necessary to use large radii bends in the pipelines.

A riser module is shown in FIG. 15. The riser module is designed to be connected to the vertical end of the corner module. Since the riser module is substantially vertical, each of the pipelines includes at least one insulation hanger support 71 to prevent insulation damage due to its own weight. Each of the pipelines in the system has a main anchor support 70 at the upper end of the module. Each pipeline also includes an expansion joint 30 below the main anchor 70 on the riser module and above the main anchor 70 on the vertical section of the corner module. The expansion joint 30 must be capable of handling the contraction between those main anchor supports. The other construction details of the riser module are similar to the details of the pressure vessel module that was discussed above.

The riser module also includes a pressure vessel 9 surrounding the expansion joints. A number of crossmembers 27 support two main guide supports 28 for each pipeline, one on each side of each expansion joint. As was described with regard to the pressure vessel modules, the insulation under the sliding main guide supports 28 is preferably a higher density polyurethane foam that is better able to resist bending moments adjacent the ends of the expansion joints.

Figures 17, 18, 19:
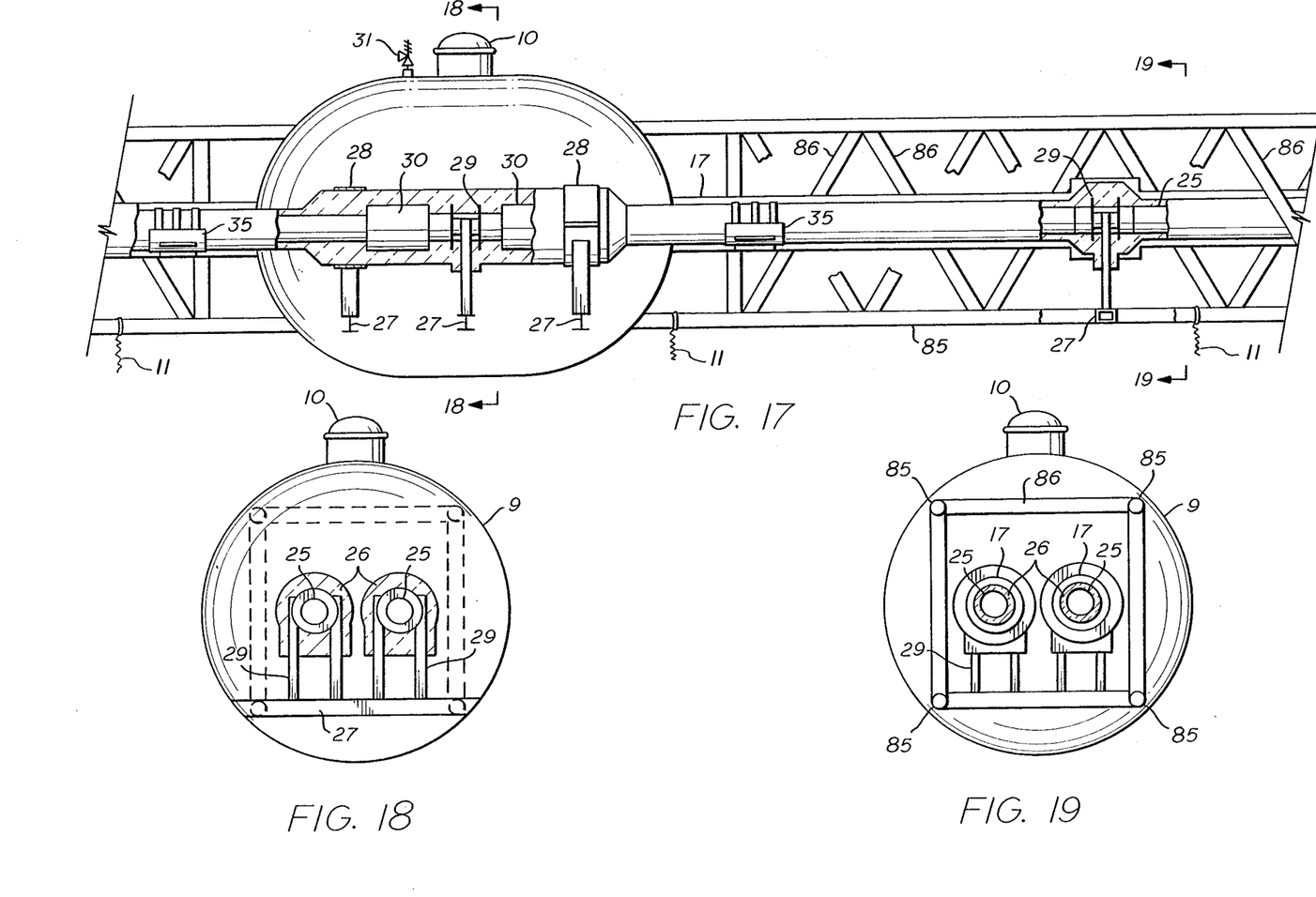
FIG. 17 is a side view of a second embodiment of the invention.
FIG. 18 is a cross sectional view at lines A-A of the embodiment of the invention of FIG. 17.
FIG. 19 is a cross sectional view at lines B-B of the embodiment of the invention of FIG. 17.

A section of a second embodiment of the invention is illustrated in FIG. 17, 18 and 19. In the second embodiment, the frame is comprised of a plurality of elongate members 85 interconnected by a plurality of braces 86. In FIG. 17, there are four members 85 configured into a rectangular truss and the pipeline system includes two pipelines. However, this embodiment is not limited to rectangular trusses or two pipelines. Although only a section of the second embodiment of the invention is shown, it is apparent that the features and principles discussed above with regard to the preferred embodiment are equally applicable to the second embodiment. For example, the second embodiment of the invention would also preferably be provided in modular sections, i.e. straight, pressure vessel, corner and inner modules, for assembly on-site and the details of construction of the modules will be apparent from the foregoing description.

The elongate members 85 are preferably attached to the pressure vessel 9, such as welding, so that the pressure vessel is an integral part of the frame. The outer jacket 17 of each pipeline is also attached to the pressure vessel 9. Inside the pressure vessel, a plurality of lateral crossmembers 27 are attached to the inside of the pressure vessel and support the primary intermediate pipe anchors 29 of the pipelines. The pressure vessel 9 also includes a pressure relief valve 31 and a water tight hatch 10 to make the interior of the pressure vessel accessible to divers or submersibles. Each pipeline has a pair of expansion joints 30 located inside the pressure vessel, with one expansion joint on each side of the primary intermediate pipe anchor. Main guide supports 28 support the inner pipe 25 and insulation and protect the ends of the expansion joints 30 from bowing and bending loads. About midway between successive pressure vessels, secondary intermediate pipe anchors 29 attach the inner pipe 25 to the truss structure. The construction of these intermediate anchors can be that shown in FIGS. 17, or 6 and 7 or they could be constructed as shown in FIGS. 10 and 11. If the latter construction is used, some type of saddle would be needed that would attach to the outer jacket 17 of the pipeline to the lateral crossmember 27.

In a third embodiment, the invention comprises an inner pipe constructed out of Invar steel. Since the coefficient of thermal expansion of Invar is so low, an Invar inner pipe can be fixed at regular intervals without danger of yielding the material when it is cooled rom ambient to cryogenic temperatures. Expansion joints are therefore not needed in an Invar pipeline system. The pipeline system in the third embodiment would have the design characteristics of the straight module shown in FIG. 5. The system would thus consist of a plurality of similar straight modules connected end to end. The preferred length between secondary intermediate anchors for an Invar system is 36.0 m. (118 ft.). The corner and riser modules for an Invar system would be like those described for the first embodiment above, but without expansion joints. A disadvantage of an Invar system is that since design codes for Invar pipelines do not exist at this time, construction of such a system would have to await code approval.

It is believed that for all embodiments of the invention, the soil around the pipeline may freeze over a long period of time as a result of heat transfer from the soil. Since such freezing could cause frost heaving and thus damage the pipeline system, heat tracing should be considered if the design warrants it. However, such heat tracing is not considered a part of this invention.

Specific embodiments of the invention have been described above. Naturally, certain modifications of the above specified embodiments may be suggested to those skilled in the art and it is intended that this application cover all such modifications that fall within the scope of the attached claims.

I claim:

1. An underwater cryogenic pipeline system comprising:
    at least two pipelines for cryogenic fluid, such pipelines having an inner pipe for carrying the cryogenic fluid, an outer jacket around the inner pipe defining an annular space therebetween and insulation in the annular space;
    a plurality of braces connected to the outer jackets of the pipelines to form an elongated open frame adapted to be laid underwater for supporting the pipelines and resisting forces on the pipelines;
    a plurality of pipe anchors attached to the inner pipes and to the frame at a plurality of locations to transfer axial forces in the inner pipes to the frame; and
    at least one ground anchor attached to the frame for transmitting axial forces in the inner pipes to the sea bed.

2. The underwater cryogenic pipeline system of claim 1 wherein the pipe anchors comprise a plurality of intermediate pipe anchors attaching the inner pipes to the outer jackets of the pipelines.

3. The underwater cryogenic pipeline system of claim 2 wherein the pipeline system further comprises a plurality of straight modules adapted to the connected end-to-end to define a continuous pipeline system, wherein:
    the at least two pipelines comprise at least two cryogenic pipeline sections;
    the plurality of braces are connected to the outer jackets of the pipeline sections to form the elongate open frame section;
    the plurality pipe anchors further comprises at least one intermediate pipe anchor attached to the inner pipe and to the outer jacket of the pipeline section; and, further comprising at least one sliding guide in the annular space between the insulation and the outer jacket and adapted to permit relative axial movement between the insulation and the inside of the outer jacket of the pipeline section.

4. The underwater cryogenic pipeline system of claim 3 wherein the inner pipes are Invar steel.

5. The underwater cryogenic pipeline system of claim 4 wherein the sliding guide comprises a saddle around the insulation in the annular space between the insulation and the inside of the outer jacket, and at least one sliding block attached to the saddle between the saddle and the inside of the outer jacket, wherein the sliding block is constructed out of material that will slide on the inside of the outer jacket.

6. An underwater cryogenic pipeline system comprising:

at least two pipelines for carrying cryogenic fluid in underwater service, the pipelines including an inner pipe, an outer jacket around the inner pipe and defining an annular space between the outer jacket and the pipe, insulation in the annular space and a plurality of expansion joints connected to the inner pipe for accommodating contraction and expansion of the inner pipe resulting from changes in the temperature of the inner pipe;

a plurality of braces connected to the outer jackets of the pipelines to define an elongate open frame adapted to be laid underwater for supporting the pipeline and resisting axial forces in the pipeline;

a plurality of pipe anchors attached to the inner pipes and to the frame at a plurality of spaced-apart locations, wherein at least one expansion joint is located between every two successive pipe anchors;

a plurality of pressure vessels at spaced-apart locations on the frame enclosing the expansion joints in a watertight manner and including a hatch on the pressure vessel for access to the interior of the pressure vessel for expansion joint maintenance or repair, and at least one ground anchor for anchoring the pipeline system to the sea bed.

7. The underwater cryogenic pipeline system of claim 6 wherein the pipe anchors comprise primary intermediate pipe anchors attached to the inner pipes and to the frame inside the pressure vessels and secondary intermediate pipe anchors attached to the inner pipes and the outer jackets at a plurality of spaced apart locations between successive primary intermediate anchors.

8. The underwater cryogenic pipeline system of claim 7 wherein the pressure vessels are connected to the outer jackets of the pipelines in a leaktight manner.

9. The underwater cryogenic pipeline system of claim 8 wherein the frame comprises at least three pipelines interconnected by braces to define an open space frame.

10. The underwater cryogenic pipeline system of claim 8 wherein:

the expansion joints are provided in pairs at successive intervals on the inner pipes of the pipelines; and the primary intermediate pipe anchors are connected to the inner pipes between the two expansion joints in each pair; and the pressure vessels enclose the pairs of expansion joints.

11. The underwater cryogenic pipeline system of claim 10 wherein the secondary intermediate pipe anchors are located about midway between successive primary intermediate pipe anchors.

12. The underwater cryogenic pipeline system of claim 11 wherein the pipeline system includes first and second ends and further including at least one main anchor support connected to the inner pipe and the frame adjacent the first and second ends of the pipeline system, wherein the at least one main anchor support is designed to withstand transient forces in the pipeline system.

13. An underwater cryogenic pipeline system comprising:

a plurality of pipelines, each of the pipelines having an inner pipe, a plurality of expansion joints connected to the inner pipe to compensate for axial movement of the inner pipe resulting from changes in temperature therein, an outer jacket surrounding the inner pipe and defining an annular space between the inner pipe and outer jacket, and insulation in the annular space;

a plurality of braces connected to the pipelines to define an elongate frame;

a plurality of pressure vessels connected to the frame and enclosing the expansion joints in a leaktight manner, the pressure vessels including a hatch into the pressure vessel to permit access to the interior of the vessel for inspection and repair of the expansion joints;

a plurality of intermediate pipe anchors connected to the inner pipes and the frame to transfer forces in the cryogenic pipelines to the frame;

at least one main pipe anchor connected to the frame and to each of the inner pipes for resisting transient forces in the pipeline system; and means for anchoring the frame to the sea bed.

14. The underwater cryogenic pipeline system of claim 13 wherein the pressure vessels are connected to the outer jackets of the pipelines in a leaktight manner and form an integral part of the frame.

15. The underwater cryogenic pipeline system of claim 14 wherein the intermediate pipe anchors comprise primary intermediate pipe anchors inside the pressure vessels connecting the inner pipes and the pressure vessel and secondary intermediate pipe anchors between successive pressure vessels and connecting the inner pipes to the outer jackets.

16. The underwater cryogenic pipeline system of claim 15 wherein the expansion joints on each inner pipe are in adjacent pairs enclosed by the pressure vessels and wherein the primary intermediate pipe anchors are located between the two expansion joints in each pair.

17. The underwater cryogenic pipeline system of claim 16 including a plurality of main guide supports connected to the pressure vessel around the inner pipes adjacent the expansion joints in the pressure vessel, wherein the main guide supports restrain lateral movement of the inner pipes adjacent the expansion joints.

18. The underwater cryogenic pipeline system of claim 17 wherein the pressure vessels include a plurality of crossmembers connected to the pressure vessel and wherein the primary intermediate anchors are connected to the crossmembers.

19. The underwater cryogenic pipeline system of claim 18 wherein the main guide supports are connected to the crossmembers in the pressure vessel.

20. The underwater cryogenic pipeline system of claim 19 including a plurality of sliding guides inside the outer jackets and around the inner pipes, wherein the sliding guides permit relative axial movement between the inner pipe and the outer jacket in response to expansion and contraction of the inner pipe resulting from changes in temperature therein.

21. An underwater cryogenic pipelines system comprising:
a plurality of cryogenic pipelines, each of the pipelines having an inner pipe, a plurality of expansion joints connected to the inner pipe to compensate for axial movement of the inner pipe resulting from changes in temperatures therein, an outer jacket surrounding the inner pipe and defining an annular space between the inner pipe and outer jacket, and insulation in the annular space;
a plurality of braces connected to the outer jackets of the pipelines to define an elongate frame;
a plurality of pressure vessels connected to the outer jackets of the pipelines and enclosing the expansion joints in a leaktight manner, the pressure vessels including a hatch opening into the interior of the pressure vessel for inspection and repair or replacement of the expansion joints;
a plurality of primary intermediate pipe anchors inside the pressure vessels and connected to each of the inner pipes and the pressure vessel to transfer axial forces from the pipelines to the frame;
a plurality of secondary intermediate pipe anchors located between successive pressure vessels and connecting the inner pipes and the outer jackets of the pipelines;
at least one main anchor connected to the frame and to the inner pipes for resisting transient loads in the pipeline system; and
means for anchoring the pipeline system to the sea bed.

22. The underwater cryogenic pipeline system of claim 21 wherein the expansion joints are provided in adjacent pairs at successive intervals on the inner pipes of the pipelines, and the primary intermediate pipe anchor is between the two expansion joints in each pair.

23. The underwater cryogenic pipeline system of claim 22 including a plurality of main guide supports around the inner pipe adjacent the ends of the expansion joints to restrain the inner pipe against lateral movement.

24. The underwater cryogenic pipeline system of claim 23 wherein the pressure vessels include a plurality of crossmembers connected to the pressure vessel and wherein the main intermediate pipe anchors and the main guide supports are attached to the crossmembers.

25. The underwater cryogenic pipeline system of claim 24, including a plurality of sliding guides inside the outer jackets of the pipelines between the inner pipes and the inside of the outer jackets for permitting relative axial sliding movement between the inner pipes and outer jackets.

26. The underwater cryogenic pipeline system of claim 25 wherein the cryogenic pipeline system has first and second ends, and further comprising at least two main pipe anchors connected to the inner pipes and outer jackets of the pipelines adjacent the first and second ends of the pipeline system, wherein the main pipe anchors withstand loadings due to transient forces in the pipeline system.

27. An underwater cryogenic pipeline sytem comprising a plurality of modules adapted to be connected together to form a continuous pipeline system, the modules comprising:
a plurality of pressure vessel modules, comprising a plurality of first cryogenic pipeline sections, each of the first pipeline sections including a first inner pipe, a first pair of expansion joints connected to the inner pipe, a first outer jacket surrounding the first inner pipe and defining an annular space therebetween, and insulation in the annular space;
a plurality of first braces connected to the outer jackets of the pipelines to define an elongate frame;
a plurality of first pressure vessels connected to the first outer jackets of the first pipeline sections and enclosing the expansion joints in a leaktight manner, the first pressure vessels including a hatch opening into the interior of the pressure vessel;
a plurality of primary intermediate pipe anchors connected to the first inner pipes between the two expansion joints in the first pair and connected to the frame;
a plurality of main guide supports around the first inner pipes adjacent the expansion joints and connected to the frame for restraining the ends of the first inner pipes adjacent the expansion joints from lateral movement; and
a plurality of first sliding guides around the first inner pipes inside the first outer jackets for allowing relative axial movement between the first inner pipes and first outer jackets.

28. The underwater cryogenic pipeline system of claim 27, further comprising: a plurality of straight modules, comprising:
a plurality of second cryogenic pipeline sections, including a plurality of second inner pipes, second outer jackets surrounding the second inner pipes and defining annular space therebetween, and insulation in the annular spaces;
a plurality of second braces connected to the second outer jackets of the second pipeline sections to define an elongate straight frame section;
a plurality of secondary intermediate pipe anchors connecting the second inner pipes and the second outer jackets of the pipelines; and
a plurality of second sliding guides around the second inner pipes inside the second outer jackets.

29. The underwater cryogenic pipeline system of claim 28, further comprising: at least one corner module, comprising:
a plurality of third cryogenic pipeline sections, each of the third pipeline sections including a curved inner pipe, a third outer jacket surrounding the curved inner pipe and defining an annular space therebetween, and insulation in the annular space;
a plurality of third braces connected to the third outer jackets of the third pipeline sections to define a curved frame section; and
at least one first main pipe anchor on each of the third pipeline sections, wherein the first main pipe anchor is designed to withstand forces resulting from transient loadings in the pipeline.

30. The underwater cryogenic pipeline system of claim 29 wherein the first main pipe anchor comprises a pipe anchor connecting the curved inner pipes to the third outer jackets of the pipeline sections.

31. The underwater cryogenic pipeline system of claim 30 wherein the corner module comprises a first section having a first axial orientation and a second section having a second axial orientation and wherein the corner module includes main pipe anchors on the first section and on the second section.

32. The underwater cryogenic pipeline system of claim 31 wherein the bend in the curved inner pipes of the pipeline sections is about five times the diameter of the pipeline sections.

33. The underwater cryogenic pipeline system of claim 31, further comprising at least one riser module comprising:
 a plurality of fourth pipeline sections, each of the pipeline sections including a fourth inner pipe, at least one expansion joint connected to the fourth inner pipe, a fourth outer jacket around the fourth inner pipe and defining an annular space therebetween, and insulation in the annular space;
 a plurality of fourth braces connected to the fourth outer jackets of the pipeline sections to define an elongate riser frame;
 a second pressure vessel connected to the fourth outer jackets of the fourth pipeline section and enclosing the expansion joints in a leaktight manner, the second pressure vessel including a hatch opening into the interior of the pressure vessel; and
 at least one pipe anchor connected to the fourth inner pipe at a location on the riser module such that the expansion joint is located between successive pipe anchors.

34. The underwater cryogenic pipeline system of claim 33 including a plurality of main guide supports around the fourth inner pipes adjacent the expansion joints and connected to the riser frame to restrain lateral movement of the fourth inner pipe.

35. The underwater cryogenic pipeline system of claim 34 wherein the pipe anchor is a second main pipe anchor connected to the fourth inner pipes and fourth outer jackets of the fourth pipeline sections and designed to withstand transient loadings in the riser and corner module sections of the pipeline system.

36. The underwater cryogenic pipeline system of claim 27, including a pair of expansion joints on each inner pipe section.

37. The underwater cryogenic system of claim 36 wherein the pressure vessel is attached to the outer jackets of the pipeline sections in a leaktight manner.

38. The underwater cryogenic pipeline system of claim 37 wherein the primary intermediate pipe anchors are connected to the inner pipes between the expansion joints in each pair.

39. The underwater cryogenic pipeline system of claim 38, including
 a plurality of main guide supports around the inner pipes adjacent the expansion joints and connected to the frame for restraining the ends of inner pipes adjacent the expansion joints from lateral movement; and
 a plurality of sliding guides around the inner pipes inside the outer jackets for allowing relative axial movement between the inner pipes and outer jackets.

40. The underwater cryogenic pipeline system of claim 28 wherein the secondary intermediate anchors connect the inner pipes and the outer jackets of the pipeline sections.

41. The underwater cryogenic pipeline system of claim 40 including a plurality of sliding guides around the inner pipes inside the outer jackets.

42. The underwater cryogenic pipeline system of claim 30 wherein the corner module further comprises a first end having a first axial orientation and a second end having a second axial orientation and wherein the corner module includes main pipe anchors on the pipeline sections on the first end and on the second end.

43. The underwater cryogenic pipeline system of claim 42 wherein one end of the corner module has an upward axial orientation and further comprising an insulation hanger support connected to the insulation and to the outer jackets to support the weight of the insulation.

44. The underwater cryogenic pipeline system of claim 35 further comprising insulation hanger supports connected to the insulation and to the outer jackets to support the weight of the insulation.

45. An underwater cryogenic pipeline system comprising:
 at least one pipeline for carrying cryogenic fluid in underwater service, the pipeline including an inner pipe, an outer jacket around the inner pipe and defining an annular space therebetween, insulation in the annular space, and a plurality of expansion joints connected to the inner pipe for compensating for contraction of the inner pipe as a result of changes in the temperature of the inner pipe;
 an elongate open frame adapted to be submerged for supporting the pipelines at the sea bed, comprising at least three elongate frame members configured as an open space frame with a central longitudinal opening;
 a plurality of pressure vessels attached to the frame around the expansion joints and enclosing the expansion joints in a leaktight manner, wherein the pressure vessels include hatches for access to the expansion joints;
 a plurality of intermediate pipe anchors attached to the inner pipes and to the frame at locations on the inner pipes between successive expansion joints, so at least one expansion joint is located between each two successive intermediate pipe anchors; and
 means for anchoring the frame to the sea bed.

46. The underwater cryogenic pipeline system of claim 45 wherein the intermediate pipe anchors comprise a plurality of primary intermediate pipe anchors connected to the inner pipes and the frame and a plurality of secondary intermediate pipe anchors connected to the inner pipes and to the outer jackets and located between successive primary intermediate anchors.

47. The underwater cryogenic pipeline system of claim 46 wherein:
 the expansion joints comprise adjacent pairs of expansion joints connected to the inner pipes; and
 a primary intermediate anchor is located inside the pressure vessel between the two expansion joints in each pair.

48. The underwater cryogenic pipeline system of claim 47 wherein the frame is generally rectangular in cross section.

49. An underwater cryogenic pipeline system comprising: a plurality of pressure vessel modules adapted to be connected to each other, each comprising:
 an elongate open frame section;
 at least one cryogenic pipeline section comprising an inner pipe, an outer jacket around the inner pipe defining an annular space therebetween, insulation in the annular space, and at least one expansion joint connected to the inner pipe;

a pressure vessel connected to the pipeline section and enclosing the expansion joint in a watertight manner, and including a hatch on the pressure vessel for permitting access to the expansion joint;

at least one intermediate pipe anchor connected to the inner pipe and to the frame section, wherein the frame section and the at least one cryogenic pipeline section are adapted to be connected to other modules to define a continuous cryogenic pipeline mounted in a continuous frame; and means for anchoring at least one of the modules to the sea bed.

50. The underwater cryogenic pipeline system of claim 49 further including a plurality of straight modules adapted to be connected to the pressure vessel modules, comprising:

an elongate open frame section;

at least one cryogenic pipeline section comprising an inner pipe, an outer jacket around the inner pipe defining an annular space therebetween, and insulation in the inner space; and means for anchoring the inner pipe to the frame.

51. The underwater cryogenic pipeline system of claim 50 wherein the expansion joints connected to the inner pipe on the pressure vessel module are in adjacent pairs, the pressure vessel modules include primary intermediate pipe anchors between the expansion joints in each pair anchoring the inner pipe to the inside of the pressure vessel and the straight modules include secondary intermediate pipe anchors located so they will be about midway between successive primary intermediate pipe anchors on the pipeline system, wherein the secondary intermediate pipe anchors comprise a pipe anchor attaching the inner pipe to the frame, whereby the continuous pipeline defined by the modules has at least one expansion joint between successive intermediate pipe anchors.

52. The underwater cryogenic pipeline system of claim 51 wherein the pressure vessel is connected to the outer jacket of the pipeline section on the pressure vessel module and the frame is connected to the pressure vessel, whereby the pressure vessel is an integral part of the frame.

53. The underwater cryogenic pipeline system of claim 52 wherein:

the pressure vessel modules include a plurality of crossmembers attached inside the pressure vessels and the primary intermediate pipe anchors are connected to the inner pipe and the crossmembers; and including a plurality of main guide supports connected to the crossmembers for restraining lateral movement of the inner pipe adjacent the expansion joint.

54. The underwater cryogenic pipeline system of claim 51 including a plurality of sliding guides inside the outer jacket between the inner pipe and the inside of the outer jacket for permitting relative axial movement between the inner pipe and outer jacket.

55. The underwater cryogenic pipeline system of claim 54 wherein the frame sections comprise:

at least three elongate frame members;

a plurality of braces connected to the elongate frame members to form an elongate open space frame section;

at least one lateral crossmember connected to the frame section and adapted to be connected to the inner pipe of the pipeline section to locate the pipeline section in the longitudinal opening.

56. The underwater cryogenic pipeline system of claim 55 wherein the frame section comprises four elongate frame members and is rectangular in cross section.

* * * * *